United States Patent
Jagadeesan (10) Patent No.: US 6,836,804 B1
(45) Date of Patent: Dec. 28, 2004

(54) VOIP NETWORK

(75) Inventor: Ramanathan T. Jagadeesan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 691 days.

(21) Appl. No.: 09/702,193

(22) Filed: Oct. 30, 2000

(51) Int. Cl.[7] .................. G06F 15/16; G06F 11/00; H04J 3/00; H04J 3/24
(52) U.S. Cl. .............. 709/236; 709/203; 709/246; 709/227; 714/4; 370/394; 370/473; 370/476
(58) Field of Search ................. 709/203, 236, 709/246, 230, 227, 237, 200, 217, 245, 247; 370/394, 423, 476, 493, 494, 495, 471; 714/4, 52; 375/240, 377, 244; 704/500, 205

(56) References Cited

U.S. PATENT DOCUMENTS

| | | | | |
|---|---|---|---|---|
| 4,188,506 A | * | 2/1980 | Schmid et al. | 380/39 |
| 4,208,716 A | * | 6/1980 | Porter et al. | 711/3 |
| 4,435,804 A | * | 3/1984 | Tan | 370/494 |
| 4,686,698 A | * | 8/1987 | Tompkins et al. | 348/230.1 |
| 5,150,387 A | * | 9/1992 | Yoshikawa et al. | 375/240 |
| 5,231,669 A | * | 7/1993 | Galand et al. | 704/205 |
| 5,467,372 A | * | 11/1995 | Nishitani | 375/244 |
| 5,621,660 A | * | 4/1997 | Chaddha et al. | 709/247 |
| 5,629,780 A | * | 5/1997 | Watson | 382/250 |
| 5,854,898 A | * | 12/1998 | Riddle | 709/231 |
| 6,122,338 A | * | 9/2000 | Yamauchi | 375/377 |
| 6,389,038 B1 | * | 5/2002 | Goldberg et al. | 370/471 |
| 6,574,593 B1 | * | 6/2003 | Gao et al. | 704/222 |
| 6,606,600 B1 | * | 8/2003 | Murgia et al. | 704/500 |

FOREIGN PATENT DOCUMENTS

WO     WO 9852187 A1 * 11/1998 ............. G10L/9/14

* cited by examiner

*Primary Examiner*—Hosain Alam
*Assistant Examiner*—Benjamin Bruckart
(74) *Attorney, Agent, or Firm*—Marger Johnson & McCollom, P.C.

(57) ABSTRACT

Devices, software and methods are provided for encoding voice data to conceal packet loss in Voice over Internet Protocol applications. The voice data of each frame is split into two groups, one of a low frequency band and one of a high frequency band. The two groups are transmitted through a network as separate packets. The high frequency group of one frame can be paired with the low frequency group of the next frame.

42 Claims, 6 Drawing Sheets

VOIP NETWORK

BACKGROUND OF THE INVENTION

1. Field of the Invention

The present invention is related to the field of telephony using a packet network protocol, and more specifically to devices, software and methods for encoding voice data to conceal packet loss.

2. Description of the Related Art

The internet is used for telephony, in addition to sending data. Accordingly, voice is encoded into digital data, the data is arranged in packets, and the packets are transmitted to the recipient over a network. This process has to happen in real time, which means that the familiar Transmission Control Protocol/Internet Protocol (TCP/IP) can not be used. Instead, other protocols are used, which permit real time use, such as the Uniform Datagram Protocol (UDP).

A disadvantage of protocols that permit real time use is that they are unreliable, in that they permit packets to be lost, without retrieving them. When that happens, the voice segments they were carrying are not reconstructed, and the recipient hears annoying gaps in speech. These gaps are perceived as reduced quality of service.

In order to conceal the fact that a packet has been lost, schemes have been devised that are called Packet Loss Concealment (PLC) schemes. According to PLC schemes, packets are generated at the receiver and played to the recipient as substitute voice. This way, at least no gap is heard in the reconstructed voice.

The simplest PLC scheme is called blind PLC, and consists of repeating to the recipient the last frame. Instead of a gap, the recipient hears the last sound extended by a little bit. This works well, to the extent that the lost packets are assumed distributed uniformly within the speech data sequence. This way, every lost packet can be reconstructed from its the previous one, which has been assumed to not be lost.

Blind PLC is unsatisfactory, because packets are not lost uniformly with time. Rather, packets tend to get lost in groups, which are called bursts. While the first few packets of the burst will be reconstructed without too much annoyance, the subsequent ones will not. If blind PLC is used, it will prolong a sound more than just a little bit. That will be more annoying.

Another PLC scheme is to merely send out redundant packets. If a packet is lost, its data is recovered from its corresponding redundant packet, which is hopefully not lost. Sending redundant packets, however, consumes substantial network bandwidth.

BRIEF SUMMARY OF THE INVENTION

The present invention overcomes these problems and limitations of the prior art.

Generally, the present invention provides devices, software and methods for encoding voice data to conceal packet loss. The voice data of each frame is split into at least two bands, which are transmitted through a network as separate packets. As a result, when a packet is lost, no single frame is completely lost. Simply, two or more frames have each lost a portion, which can be reconstructed more accurately because the whole is not lost.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, software and methods for encoding voice data to conceal packet loss. The invention is now described in more detail.

Figure 1A:
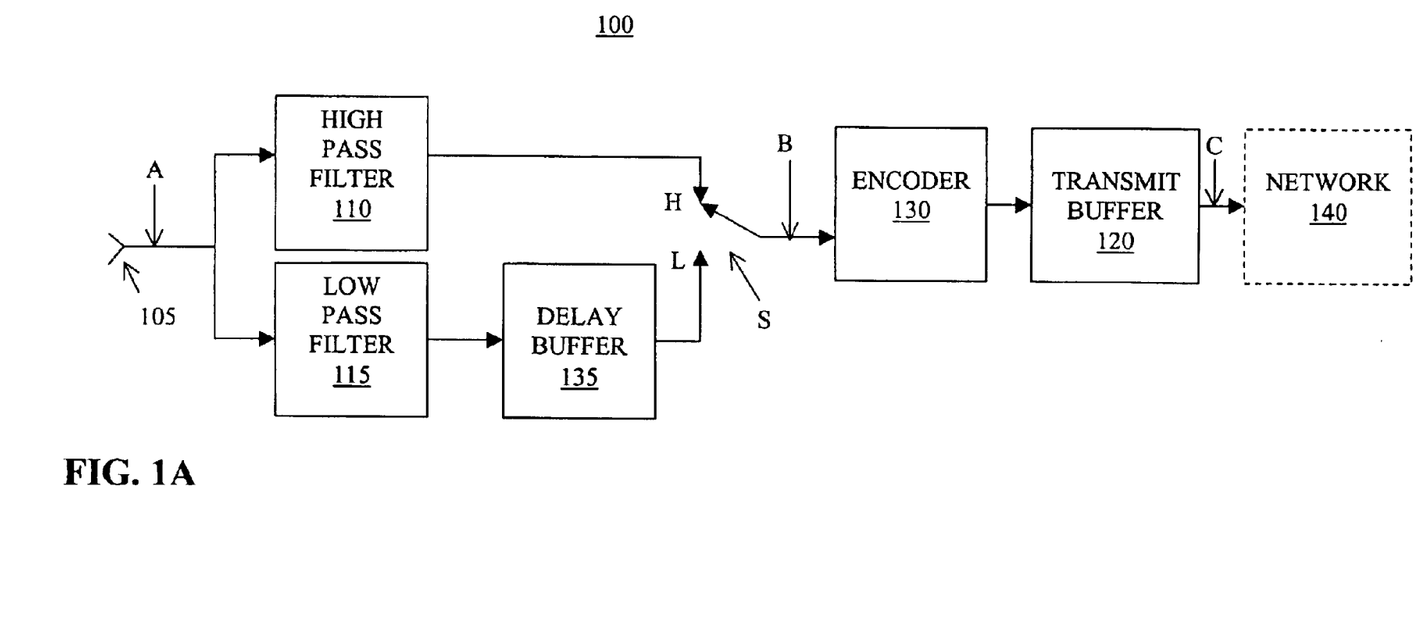
FIG. 1A is a block diagram of a transmitting device made according to an embodiment of the invention.

Referring now to FIG. 1A, a device 100 includes an input 105 for receiving voice data, in other words, data that represents sound. It also includes a low pass filter 115, for selecting a first group of the data. The first group of the data represent sound within a low portion of the sound bandwidth. Device 100 also includes a high pass filter 110, for selecting a second group of the data. The second group of the data represent sound within a high portion of the sound bandwidth.

Device 100 also includes a transmit buffer 120. The transmit buffer 120 is for transmitting to a network 140 the first data group in a first packet, and the second data group in a second packet. The first and second packets are different from each other.

Device 100 also includes an encoder 130. The encoder 130 is for encoding the first data group and the second data group, prior to transmitting it.

In the embodiment of FIG. 1A, device 100 also includes a switch S. The switch S has a first position L, for the transmit buffer 120 to receive the first data group from the low pass filter 115. The switch S also has a second position H, for the transmit buffer 120 to receive the second data group from the high pass filter 110.

In the embodiment of FIG. 1A, the first data group and second data group are generated simultaneously. That is why it is preferred to provide a delay buffer 135 for delaying the arrival to the switch S of one of the first data group and the second data group.

In device 100, three points A, B, C are designated. Subsequent processing is described with reference to these three points A, B, C.

Figure 1B:
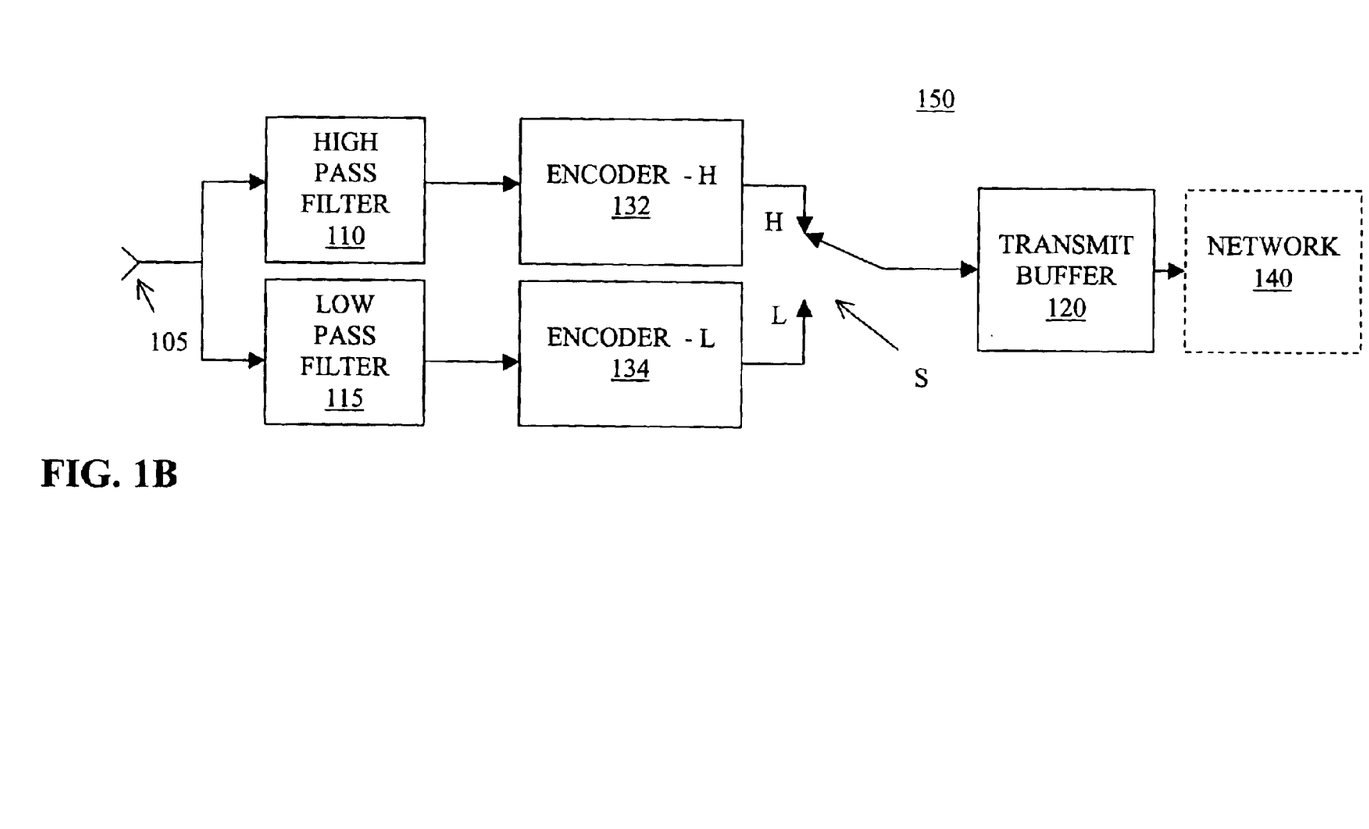
FIG. 1B is a block diagram of a transmitting device made according to another embodiment of the invention.

Referring now to FIG. 1B, a device 150 according to the invention is described. Device 150 includes a lot of components similar to device 100 of FIG. 1A. A noteworthy difference is that, instead of providing a single encoder 130, two encoders 132, 134 are provided. Of those, Encoder-H 132 encodes the output of high pass filter 110, and Encoder-L 134 encodes the output of the low pass filter 115. In addition, a delay buffer (not shown separately) may optionally be used, to accommodate the transmit buffer 120.

Figure 2A:
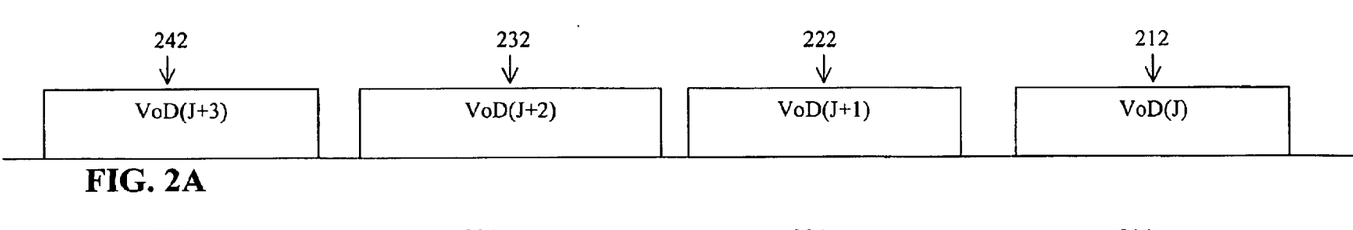
FIG. 2A is a diagram of data at a point A in the device of FIG. 1A.
Figure 2B:
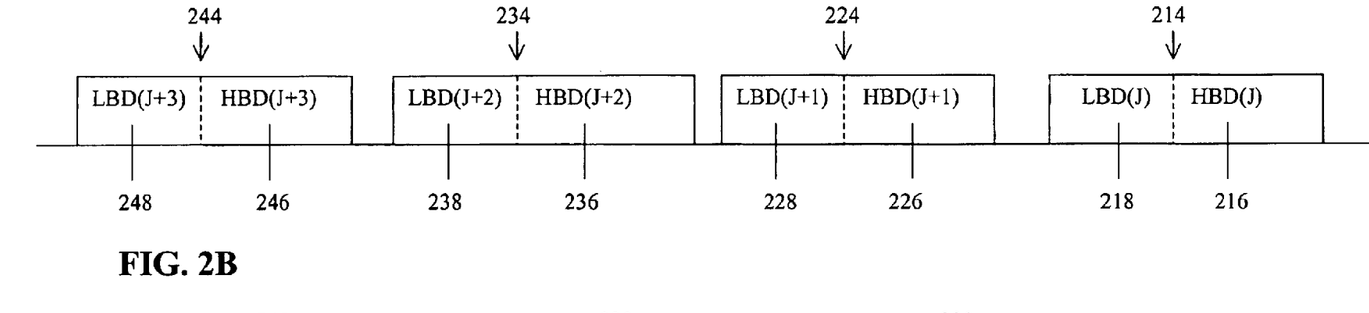
FIG. 2B is a diagram of data at a point B in the device of FIG. 1A, according to an embodiment of the invention.
Figure 2C:
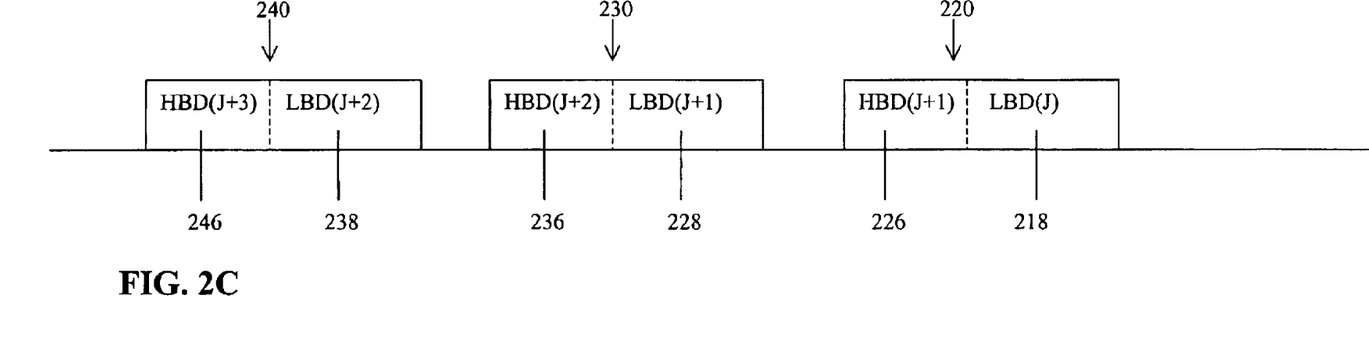
FIG. 2C is a diagram of data at a point C in the device of FIG. 1A, according to an embodiment of the invention.

Referring to FIGS. 2A, 2B, and 2C, diagrams of the data are shown. They refer to data as they pass from points A, B, C, respectively, of device 100.

FIG. 2A shows sequential voice data VoD(J), VoD(J+1), VoD(J+2). VoD(J+3), arranged in respective sequential frames 212, 222, 232, 242, as they pass point A. These frames are depicted as groups, and also equivalently as packets, but that is done solely for the sake of convenience, to illustrate the processing. In fact, the sequential voice data could equivalently have been shown as contiguous, as not yet encoded. In this case, J is a convenient index of the data in the sequence of the voice stream.

FIG. 2B shows four frames 214, 224, 234, 244 of voice data. These frames 214, 224, 234, 244, can be considered to be in group format, or equivalent packet format where the leading header and the trailing header are not shown. Only the data is shown, also known as payload of the packet, for easier comparison with respective data of FIG. 2A.

Frame 214 contains a first group 216 of high-band data HBD (J), and a second group 218 of low-band data LBD (J). In other words, frame 214 has the same data as frame 212 of FIG. 2A, except that its high band data is arranged in the first group 216, and its low band data is arranged in the second group 218. In this context, the terms high band and low band refer to sound bandwidth. It will be observed that the low band data follows the high band data because the delay buffer 135 delays the low band data with respect to the high band data. The reverse order is an equivalent of this invention, accomplished by placing the delay buffer 135 in the branch of the other data group.

Similarly, frame 224 has the same data as frame 222, rearranged in two groups 226, 228. And frame 234 has the same data as frame 232, rearranged in two groups 236; 238. Plus frame 244 has the same data as frame 242, rearranged in two groups 246, 248.

Referring now to FIG. 2C, three data packets 220, 230, 240 are shown. Again, these are shown in group format, or equivalently packet format where the leading header and the trailing header are not shown. Only the data is shown, also known as payload of the packet, for easier comparison with respective data of FIG. 2B.

It will be observed that data packet 220 carries the second group 218 of frame 214, and the first group 226 of next frame 224. Similarly, data packet 230 carries the second group 228 of frame 224, and the first group 236 of next frame 234. Plus, data packet 240 carries the second group 238 of frame 234, and the first group 246 of next frame 244.

Equivalently, the data groups of a frame can be in succeeding packets, or many packets away from each other. The latter is preferred if packet losses are determined to occur in bursts.

Figure 3:
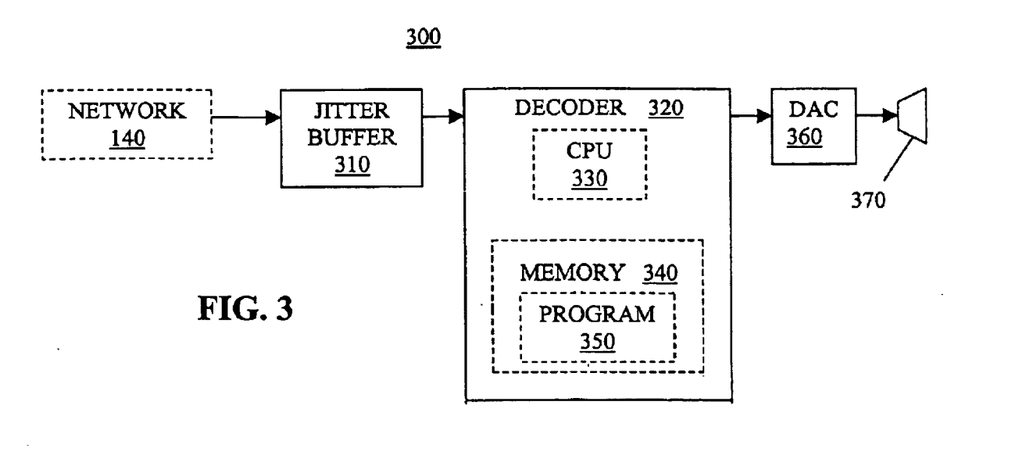
FIG. 3 is a block diagram of a receiving device made according to an embodiment of the invention.

Referring to FIG. 3, a receiving device 300 according to the invention is described. Device 300 includes a network interface for interfacing with network 140. The network interface can be implemented as a stand-alone feature, or in conjunction with another component, such as a jitter buffer.

Optionally and preferably device 300 includes a jitter buffer 310. This stores a number of frames immediately as they are received from the network 140. The jitter buffer 310 thus prevents the jitter that would be experienced if frames were played out in the same order they are received. That order could be scattered, due to the nature of transmission through the network 140.

Device 300 also includes a decoder 320. One or more of the components of device 300, or other devices of the invention, can be implemented in combination with each other, consistently with components of this description. In the embodiment of FIG. 3, decoder 320 includes a processor 330, which is also referred to as Central Processing Unit (CPU) 330, and a memory 340. The processor 330 is adapted to perform a method of the invention. Preferably it is so adapted by running a program 350 made according to the invention, which program 350 resides on memory 340.

Device 300 can also include other components, such as a Digital to Analog Converter (DAC) 360. This converts the decoded voice data into an analog signal, which can be input into a speaker 370.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program, and a method of operation of the program. The program is most advantageously implemented as a program for a computing machine, such as a general purpose computer, a special purpose computer, a microprocessor, etc.

The invention also provides a storage medium that has the program of the invention stored thereon. The storage medium is a computer-readable medium, such as a memory, and is read by the computing machine mentioned above.

A program is here, and generally, a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they can be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming can use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention can be implemented by themselves, or in combination with others. Even though it is said that the program can be stored in a computer-readable medium, it should be clear to a person skilled in the art that it need not be a single memory, or even a single machine. Various portions, modules or features of it can reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These can be optionally performed in conjunction with one or more human operators performing some, but not all of them. As per the above, the users need not be collocated with each other, but each only with a machine that houses a portion of the program. Alternately, some of these machines can operate automatically, without users and/or independently from each other.

Methods of the invention are now described in more detail.

Figure 4:
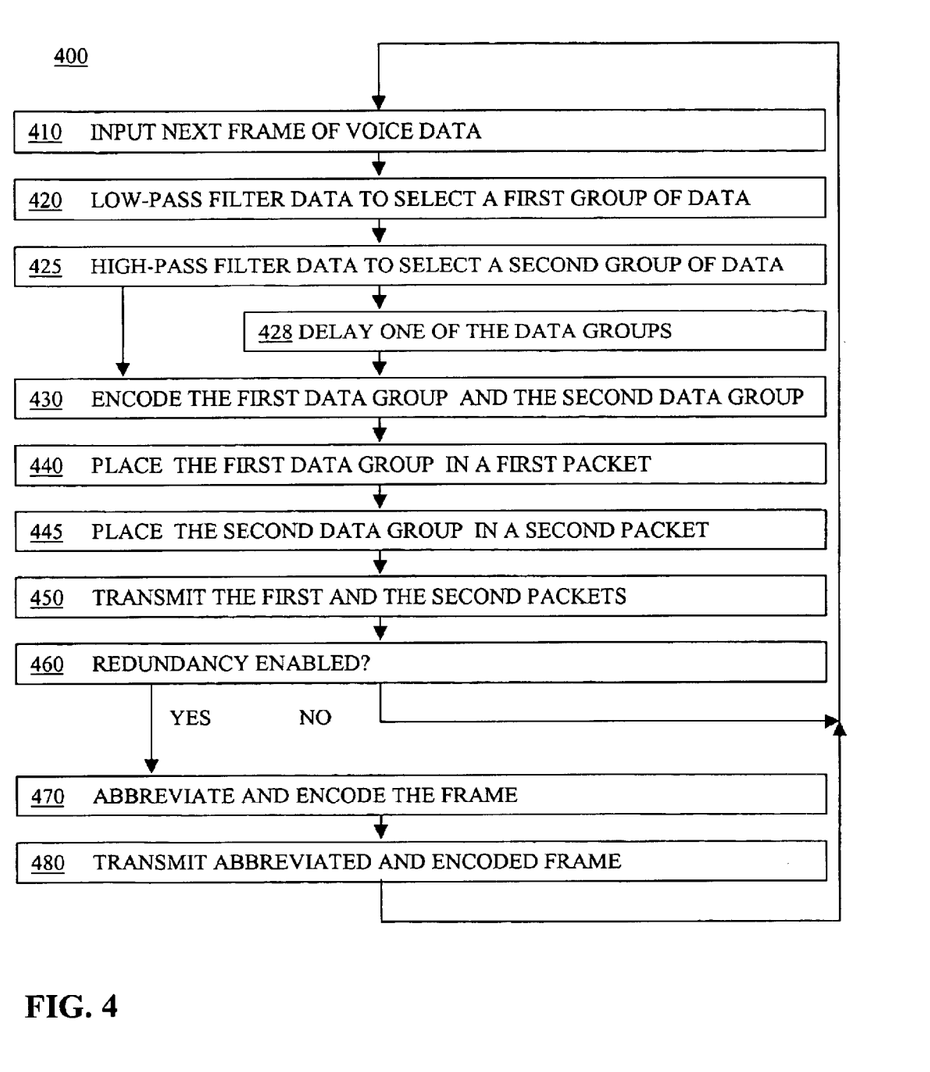
FIG. 4 is a flowchart for illustrating a transmitting method according to an embodiment of the invention.

Referring now to FIG. 4, a flowchart 400 is used for illustrating a transmitting method according to an embodiment of the invention. It will be understood by a person skilled in the art that flowchart 400 can be a part of a larger flowchart, in a context where sequential voice data is arranged in a plurality of frames.

According to a box 410, a next frame of voice data is input.

The data is then divided into a first group that represents sound within a first band of the sound bandwidth, and a second group that represents sound within a second band. Preferably the first band is a low-frequency band, and the second band is a high frequency band. More particularly, dividing the data is performed as follows.

According to a box 420, the voice data of the frame is low-pass filtered to select the first group of data. According to a box 425, the voice data of the frame is also high pass filtered to select the second group of data. According to an optional box 428, one of the data groups is delayed, so that a single-input transmit buffer, and also possibly a single encoder, can be used for processing both data groups.

According to a box 430, the first data group and the second data group are encoded for transmission through a network.

According to a box 440, the first data group is placed in a first packet. According to a box 445, the second data group is placed in a second packet, which is different from the first packet. Optionally and preferably, the first packet also includes data from a second frame that is different from the first frame. In addition, the second packet also includes data from a third frame that is different from the first frame and the second frame.

According to a box 450, the first packet and the second packet are transmitted through the network.

According to an optional box 460, it is inquired whether redundancy is enabled. If not, then execution returns to box 410.

If yes, then according to a box 470, the frame is abbreviated and encoded. Methods for the abbreviating and encoding are described below.

According to a subsequent box 480, the abbreviated and encoded frame is also transmitted through the network. Execution then returns to box 410.

In the preferred embodiment, the data that represents sound is arranged in sequential frames. The data of each frame is divided into data of the first group, and data of the second group, as per the above. In addition, the first data group of one frame is encoded together with the second data group of one of the neighboring frames. The neighboring frame can be either the preceding frame or the succeeding frame in the sequence.

When that is done for the entire sequence of frames, a robust chain results. Even when one packet is lost, no single frame is completely lost. Simply, two or more frames have each lost a portion. These portions can be reconstructed more accurately, because the whole is not lost in either one of them.

In addition, the redundant transmission of abbreviated frames is performed preferably in groups of data. In other words, the first and second groups of data are abbreviated, and then transmitted redundantly.

By way of abbreviating, the data group of the low frequency band can also be down-sampled. In addition, one of the first data groups and one of the second data groups can be used to determine a complementary band information synthesis shift. This way, only one of the first and second data groups needs to be sent, along with the shift, which will be used to reconstruct the other data group.

Figure 5:
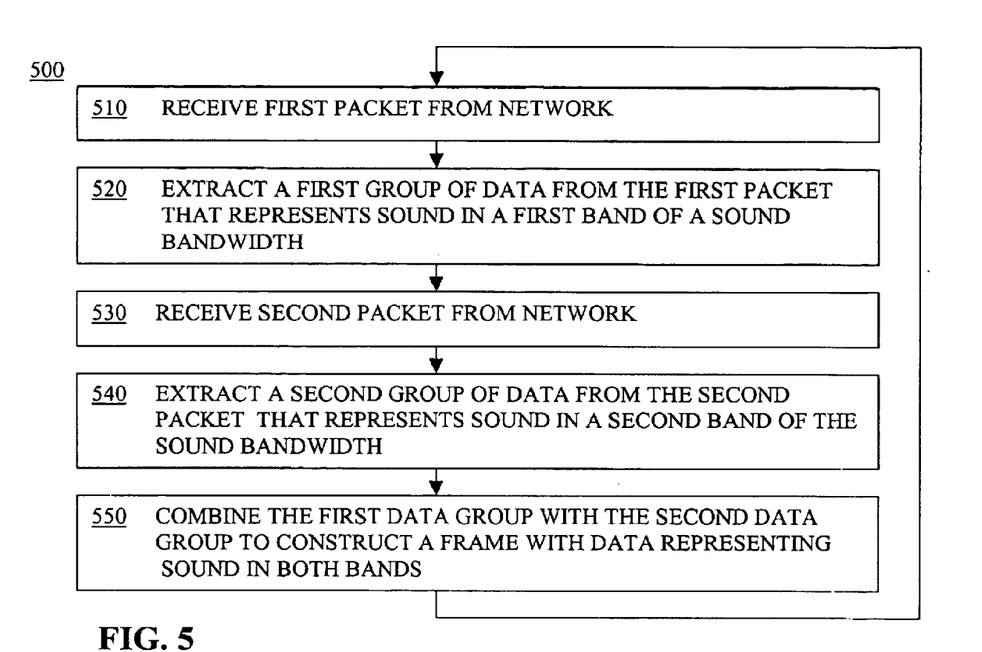
FIG. 5 is a flowchart for illustrating a receiving method according to an embodiment of the invention.

Referring now to FIG. 5, a flowchart 500 is used to illustrate a receiving method according to the invention. It will be recognized that flowchart 500 can be part of the larger flowchart, which includes playing out constructed frames.

According to a box 510, a first packet is received from a network.

According to a box 520, a first group of data is extracted from the first packet. Extracting can be by decoding. The first data group represents sound in a first band of the sound bandwidth.

According to a box 530, a second packet is received from the network.

According to a box 540, a second group of data is extracted from the second packet. The second data group represents sound in a second band of the sound bandwidth.

According to a box 550, the extracted first data group and the extracted second data group are combined to construct a frame with data that represents sound in both bands. Execution then returns to box 510.

Figure 6:
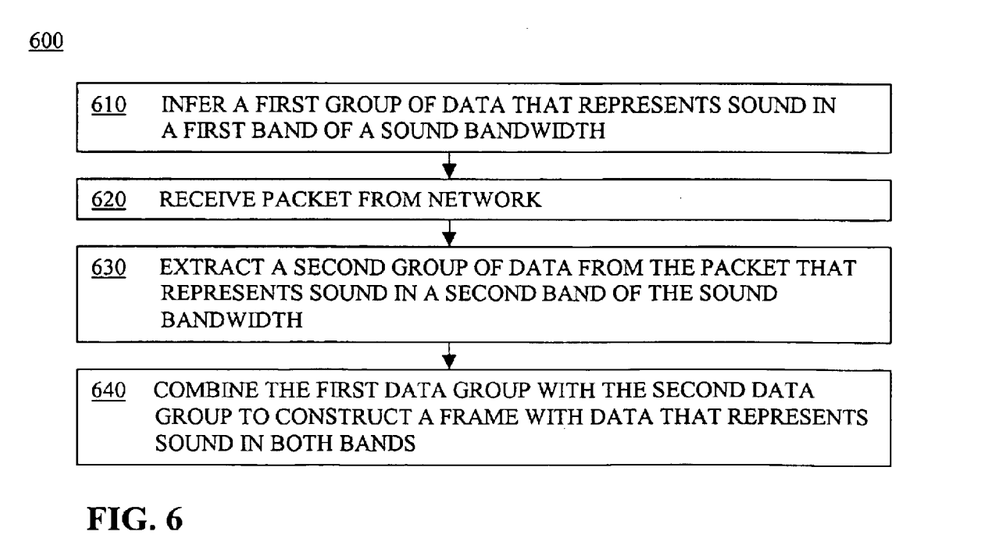
FIG. 6 is a flowchart for illustrating another receiving method according to an embodiment of the invention.

Referring now to FIG. 6, a flowchart 600 is used to illustrate another receiving method according to the invention. It will be recognized that flowchart 600 is a variant of flowchart 500, for when an expected packet is lost. In the case of flowchart 600, it is assumed that one of the packets is lost, which means that it has not arrived in time for play out.

According to a box 610, a first group of data is inferred, which represents sound in a first band of the sound bandwidth. The data is inferred from other similar data in the first band. For example, the first band data of the previous packet can be repeated. In addition, first band data from many previous packets can be added to form a weighted average, etc. Other ways of inferring the first data group are described below.

According to a box 620, a packet is received from the network.

According to a box 630, a second group of data is extracted from the packet. The second data group represents sound in a second band of the sound bandwidth.

According to a box 640, the inferred first data group and the extracted second data group are combined to construct a frame with data that represents sound in both bands. Execution then returns to box 610.

Other ways of inferring the first data group according to box 610 are now described. One of the problems that the invention addresses is how to infer data whose packet has been lost. But it should be borne in mind that the designations first band and second band do not necessarily mean low-frequency band, and high-frequency band, respectively.

Inferring the data can be implemented by receiving abbreviated redundant data that corresponds to the lost first data group. The received abbreviated data is decoded and expanded. Expanding can include up-sampling of the abbreviated data, which is particularly useful if the received abbreviated data is of a low-frequency band.

Alternately, inferring can be performed by using a complementary band information synthesis shift for reconstructing data in the first band from data in the second band. The value of the shift can be either received from the network and decoded as an additional input value, or determined from received data. It can be determined from at least one other received first data group, and at least one received second data group. Alternately, it can be received from statistics of received first and second groups, such as weighted averages, etc.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

What is claimed is:

1. A transmitting device comprising:

an input to receive a plurality of data frames that represent sound;

a low pass filter to select a first group of the data that represents a low frequency portion of the sound, where the first data group is a portion of a data frame within the plurality of data frames;

a high pass filter to select a second group of the data that represents a high frequency portion of the sound, where the second data group is a portion of the data frame within the plurality of data frames;

an encoder to encode the first data group of a first data frame and the second data group of a second data frame into a first packet and encoding the first data group of the second data frame and the second data group of a third data frame into a second packet distinct from the first packet; and a transmit buffer to transmit to a network the first packet and the second packet.

2. The device of claim 1, where the encoder sends the first and second packet to the transmit buffer.

3. The device of claim 2 comprising:

a switch having a first position to direct the first data group from the low pass filter to the encoder, and a second position to direct the second data group from the high pass filter to the encoder.

4. The device of claim 3 comprising:

a delay buffer to delay the arrival to the switch of one of the first data group and the second data group.

5. A receiving device comprising:

a network interface for coupling to a network; and a processor coupled with the network interface, where the processor receives a first packet, a second packet and a third packet from the network, extracts a first group of data from the first packet and the second packet representing a first low frequency band of a sound signal, extracts a second group of data from the second packet and the third packet representing a second high frequency band of the sound signal distinct from the first band, combines the first data group from the first packet with the second data group from the second packet to construct a first single data frame representing both the first high frequency band and the second low frequency band of the same sound signal, and combines the first data group from the second packet with the second data group from the third packet to construct a second single data frame representing both the first high frequency band and the second low frequency band of the same sound signal.

6. The device of claim 5, where the processor receives at least one additional packet, and extracts an additional first group of data from the additional packet representing the first low frequency band.

7. The device of claim 6, where the first data group from the first packet is identical to the additional first data group.

8. The device of claim 6, where the first data group from the second packet is identical to the additional first data group.

9. The device of claim 5, where the processor
receives abbreviated redundant data corresponding to the first data group from the first packet, and
expands the received abbreviated data.

10. The device of claim 5, where the processor
receives abbreviated redundant data corresponding to the first data group from the second packet, and
expands the received abbreviated data.

11. An article comprising a storage medium, the storage medium having stored thereon instructions, that, when executed by at least one device, result in:
arranging data that represents sound in a plurality of frames;
dividing the data of each of at least three frames into a first group that represents sound within a first band of a sound bandwidth and a second group that represents sound within a second band of the sound bandwidth;
encoding the first data group of a first data frame and the second data group of a second data frame as a first packet;
encoding the first data group of the second data frame and the second data group of a third data frame as a second packet distinct from the first packet; and
transmitting the first packet and the second packet through the network.

12. The article of claim 11,
where the first band is a low-frequency band; and
where the second band is a high-frequency band.

13. The article of claim 11, where the instructions result in:
abbreviating and transmitting redundantly the first data group through the network.

14. The article of claim 13, where the instructions result in:
abbreviating includes down-sampling the first data group.

15. An article comprising a storage medium, the storage medium having stored thereon instructions, that, when executed by at least one device, result in:
receiving three sequential frames of data that represent sound;
dividing the data of each of the three frames into a first group that represents sound within a low band of a sound bandwidth and a second group that represents sound within a high band of the sound bandwidth;
encoding the first data group of the first frame and the second data group of the second frame as a first packet;
encoding the first data group of the second frame and the second data group of the third frame as a second packet; and
transmitting the first and second packets through the network.

16. The article of claim 15, where the instructions result in:
abbreviating and transmitting redundantly at least one of the first data group and the second data group through the network.

17. An article comprising a storage medium, the storage medium having stored thereon instructions, that when executed by at least one device, result in:
receiving a first packet, a second packet and a third packet from the network,
extracting a first group of data from the first packet and the second packet representing a first low frequency band of a sound signal,
extracting a second group of data from the second packet and the third packet representing a second high frequency band of the sound signal distinct from the first band,
combining the first data group from the first packet with the second data group from the second packet to construct a first single data frame representing both the first high frequency band and the second low frequency band of the same sound signal, and
combining the first data group from the second packet with the second data group from the third packet to construct a second single data frame representing both the first high frequency band and the second low frequency band of the same sound signal.

18. An article comprising a storage medium, the storage medium having stored thereon instructions, that, when executed by at least one device, result in:
inferring a first group of data representing sound belonging in a first low band of a sound bandwidth;
receiving a packet from a network;
extracting a second group of data from the packet representing sound belonging in a second high band of the sound bandwidth distinct from the first band; and
combining the first data group with the second data group to construct a single frame with data representing sound in both the first band and the second band.

19. The article of claim 18, where the instructions result in:
receiving at least one additional packet; and
extracting an additional first group of data from the additional packet representing sound belonging in the first low band,
where the first data group is inferred from the additional first data group.

20. The article of claim 18, where the first data group is identical to the additional data group.

21. The article of claim 18, where the instructions result in:
receiving abbreviated redundant data corresponding to the first data group; and
expanding the received abbreviated data.

22. A method comprising:
arranging data that represents sound in a plurality of frames;
dividing the data of each of at least three frames into a first group that represents sound within a first band of a sound bandwidth and a second group that represents sound within a second band of the sound bandwidth;
encoding the first data group of a first data frame and the second data grout of a second data frame as a first packet;
encoding the first data group of the second data frame and the second data group of a third data frame as a second packet distinct from the first packet; and
transmitting the first packet and the second packet through the network.

23. The method of claim 22,
where the first band is a low-frequency band, and
where the second band is a high-frequency band.

24. The method of claim 22, comprising:
abbreviating and transmitting redundantly the first data group through the network.

25. The method of claim 24, where abbreviating includes down-sampling the first data group.

26. A method comprising:

receiving three sequential frames of data that represent sound;

dividing the data of each of the three frames into a first group that represents sound within a low band of a sound bandwidth and a second group that represents sound within a high band of the sound bandwidth;

encoding the first data group of the first frame and the second data group of the second frame as a first packet;

encoding the first data group of the second frame and the second data group of the third frame as a second packet; and transmitting the first and second packets through the network.

27. The method of claim 26, comprising:

abbreviating and transmitting redundancy at least one of the first data group and the second data group through the network.

28. The method of claim 27, where abbreviating includes down-sampling.

29. The method of claim 27, where abbreviating includes determining a complementary band information synthesis shift between one of the first data group and one of the second data group.

30. A method comprising:

receiving a first packet, a second packet and a third packet from the network, extracting a first group of data from the first packet and the second packet representing a first low frequency band of a sound signal, extracting a second group of data from the second packet and the third packet representing a second high frequency band of the sound signal distinct from the first band, combining the first data group from the first packet with the second data group from the second packet to construct a first single data frame representing both the first high frequency band and the second low frequency band of the same sound signal, and combining the first data group from the second packet with the second data group from the third packet to construct a second single data frame representing both the first high frequency band and the second low frequency band of the same sound.

31. A method comprising:

inferring a first group of data representing sound belonging in a first low band of a sound bandwidth;

receiving a packet from a network;

extracting a second group of data from the packet representing sound belonging in a second high band of the sound bandwidth distinct from the first band; and combining the first data group with the second data group to construct a single frame with data representing sound in both the first band and the second band.

32. The method of claim 31, comprising:

receiving at least one additional packet; and extracting an additional first group of data from the additional packet representing sound belonging in the first low band, where the first data group is inferred from the additional first data group.

33. The method of claim 31, where the first data group is identical to the additional data group.

34. The method of claim 31, where the first data group is determined from a weighted average that includes the additional data group.

35. The method of claim 31, where inferring is performed by:

receiving abbreviated redundant data corresponding to the first data group; and expanding the received abbreviated data.

36. The method of claim 35, where expanding includes up-sampling the abbreviated data.

37. The method of claim 31, where inferring includes using a complementary band information synthesis shift to infer data in the first low band from data in the second high band.

38. The method of claim 37, comprising:

receiving and decoding the complementary band information synthesis shift.

39. The method of claim 37, comprising:

determining the complementary band information synthesis shift from at least one other received first data group and at least one received second data group.

40. A transmitting device comprising:

input means for receiving a plurality of data frames that represents sound;

low pass filter means for selecting a first group of the data that represents sound within a low portion of a sound bandwidth where the first data group is a portion of a data frame within the plurality of data frames;

high pass filter means for selecting a second group of the data that represents sound within a high portion of the sound bandwidth where the second data group is a portion of the data frame within the plurality of data frames;

encoder means for encoding the first data group of a first data frame and the second data group of a second data frame into a first packet and encoding the first data group of the second data fine and the second data group of a third data frame into a second packet distinct from the first packet; and transmit buffer means for transmitting to a network first packet and a second packet distinct.

41. The device of claim 40, comprising:

switch means having a first position for the transmit buffer means to receive the first data group from the low pass filter, and a second position for the transmit buffer means to receive the second data group from the high pass filter.

42. The device of claim 41, comprising:

delay buffer means for delaying the arrival to the switch of one of the first data group and the second data group.

* * * * *

UNITED STATES PATENT AND TRADEMARK OFFICE
CERTIFICATE OF CORRECTION

PATENT NO.   : 6,836,804 B1  
DATED        : December 28, 2004  
INVENTOR(S)  : Jagadeesan It is certified that error appears in the above-identified patent and that said Letters Patent is hereby corrected as shown below:

Column 3,  
Line 8, replace "VoD(J+2). VoD(J+3)," with -- VoD(J+2), VoD(J+3) --.  
Line 36, replace "groups 236; 238." with -- groups 236, 238 --.

Column 9,  
Line 60, replace "that when" with -- that, when --.

Column 10,  
Line 51, replace "data grout of" with -- data group of --.

Column 11,  
Line 16, replace "redundancy" with -- redundantly --.  
Line 45, replace "sam sound." with -- same sound signal. --.

Column 12,  
Lines 34 and 38, replace "bandwidth where" with -- bandwidth, where --.  
Line 45, replace "data fine and" with -- data frame and --.  
Line 48, replace "network first" with -- network a first --.

Signed and Sealed this

Twenty-first Day of March, 2006

JON W. DUDAS  
*Director of the United States Patent and Trademark Office*